(12) United States Patent
Riedel

(10) Patent No.: US 11,618,165 B2
(45) Date of Patent: Apr. 4, 2023

(54) METHOD AND SYSTEM FOR OPERATING A ROBOTIC ARM

(71) Applicant: KUKA Deutschland GmbH, Augsburg (DE)

(72) Inventor: Martin Riedel, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 285 days.

(21) Appl. No.: 16/756,327

(22) PCT Filed: Oct. 12, 2018

(86) PCT No.: PCT/EP2018/077832
§ 371 (c)(1),
(2) Date: Apr. 15, 2020

(87) PCT Pub. No.: WO2019/076738
PCT Pub. Date: Apr. 25, 2019

(65) Prior Publication Data
US 2020/0276709 A1 Sep. 3, 2020

(30) Foreign Application Priority Data
Oct. 17, 2017 (DE) .................... 10 2017 009 641.4

(51) Int. Cl.
*B25J 9/16* (2006.01)
*B25J 19/06* (2006.01)

(52) U.S. Cl.
CPC ............ *B25J 9/1676* (2013.01); *B25J 19/06* (2013.01); *G05B 2219/40196* (2013.01); *G05B 2219/40478* (2013.01)

(58) Field of Classification Search
CPC ......... A61B 34/10; A61B 34/20; A61B 34/30; A61B 34/37; B25J 9/1666; B25J 9/1671; B25J 9/1674; B25J 9/1676; B25J 19/06; G05B 2219/40196; G05B 2219/40478
USPC ........................................................ 700/264
See application file for complete search history.

(56) References Cited

U.S. PATENT DOCUMENTS

| 9,375,841 B1 | 6/2016 | Kemper |
| 9,596,451 B2 | 3/2017 | Walter et al. |
| 2009/0114053 A1* | 5/2009 | Mikaelsson ............ B25J 9/0009 901/42 |

(Continued)

FOREIGN PATENT DOCUMENTS

| CH | 701886 A2 * | 3/2011 | .............. B25J 19/06 |
| CH | 701886 A2 | 3/2011 | |

(Continued)

OTHER PUBLICATIONS

European Patent Office; Search Report in related International Patent Application No. PCT/EP2018/077832 dated Feb. 26, 2019; 2 pages.

(Continued)

*Primary Examiner* — Stephen R Burgdorf
(74) *Attorney, Agent, or Firm* — Dorton & Willis, LLP

(57) ABSTRACT

A method for operating a robotic arm using a first visualization device includes visually indicating, on the robotic arm and/or in the workspace of the robotic arm and/or on a work surface below the robotic arm, an imminent adjustment of at least one axis of the robotic arm, in particular of at least one axis closest to the robotic arm base.

10 Claims, 2 Drawing Sheets

(56) References Cited

U.S. PATENT DOCUMENTS

| | | | | |
|---|---|---|---|---|
| 2011/0176148 | A1* | 7/2011 | Briggs | G01B 5/008 |
| | | | | 356/614 |
| 2012/0182155 | A1 | 7/2012 | Sato et al. | |
| 2014/0067121 | A1* | 3/2014 | Brooks | B25J 9/1676 |
| | | | | 700/255 |
| 2015/0042485 | A1* | 2/2015 | Suessemilch | G08B 5/36 |
| | | | | 340/815.4 |
| 2016/0263752 | A1 | 9/2016 | Edsinger | |
| 2017/0087731 | A1* | 3/2017 | Wagner | B25J 9/1676 |
| 2017/0120460 | A1 | 5/2017 | Burmeister et al. | |
| 2017/0248936 | A1 | 8/2017 | Hoshino | |
| 2019/0054637 | A1* | 2/2019 | Asada | F16H 21/54 |

FOREIGN PATENT DOCUMENTS

| | | |
|---|---|---|
| DE | 102015001575 A1 | 8/2016 |
| DE | 102017101904 A1 | 8/2017 |
| EP | 2558886 B1 | 3/2014 |
| WO | 2016000770 A1 | 1/2016 |
| WO | 2016173609 A1 | 11/2016 |
| WO | 2017044630 A1 | 3/2017 |

OTHER PUBLICATIONS

German Patent Office; Office Action in related German Patent Application No. 10 2017 009 641.4 dated Jul. 19, 2018; 5 pages.
European Patent Office; Search Report in related International Patent Application No. 18 786 308.9 dated Oct. 22, 2021; 8 pages.

* cited by examiner

METHOD AND SYSTEM FOR OPERATING A ROBOTIC ARM

CROSS-REFERENCE TO RELATED APPLICATIONS

This application is a national phase application under 35 U.S.C. § 371 of International Patent Application No. PCT/EP2018/077832, filed Oct. 12, 2018 (pending), which claims the benefit of priority to German Patent Application No. DE 10 2017 009 641.4, filed Oct. 17, 2017, the disclosures of which are incorporated by reference herein in their entirety.

TECHNICAL FIELD

The present invention relates to a method and a system for operating a robotic arm as well as a robot having the system and a computer program product for executing the method.

BACKGROUND

When humans collaborate with robots, which comprise robotic arms, generally humans will involuntarily keep an eye on the robotic arms so that in the event of an unforeseen movement, they can quickly move out of the way, which impairs the collaborative operation. In addition, collisions of robotic arms with humans due to robotic arm movements not expected by a human impair their cycle times.

SUMMARY

The object of the present invention is to improve the operation of robots having robotic arms.

This object is achieved by a method, a system or computer program product for executing a method, or a robot having a system as described herein.

According to one embodiment of the present invention, in a method for operating a robotic arm, by a visualization means, which in the present case is also referred to as the first visualization means without restricting the generality, an imminent adjustment of at least one axis of the robotic arm, in one embodiment not all but only one (real) partial quantity of the axes of the robotic arm, in particular (also) the axis, closest to the robotic arm base, of the robotic arm, is visually indicated temporarily or continually, prior to and/or during operation of the robot, on the robotic arm and/or its work space and/or on a work surface under the robotic arm or (visually) displayed (for humans) in the work space of the robotic arm.

A or the human in the workspace of the robotic arm can hereby better concentrate on his/her task, without having to observe the complete robotic arm at least out of the corner of the eye. Additionally or alternatively, the risk of a collision of the robotic arm with a or the human in the workspace of the robotic arm due to movements of the robotic arms, which the human did not anticipate, and thus an impairment of cycle times of the robotic arm due to collision-caused downtimes and/or velocity reductions are reduced.

In one embodiment, the robotic arm comprises at least three, in particular at least six, in one embodiment at least seven, joints or axes, in particular rotary joints or axes, which are adjusted by drives, in particular electric motors or similar.

Given such complex (more complex), in particular redundant, actuated robotic arms, the present invention can be used in a particularly advantageous manner.

An imminent adjustment in one embodiment can comprise, in particular be, a temporal, in particular direct, adjustment following the current moment in time, in particular an adjustment as a result of a next program command (to be executed) or multiple subsequent program commands (to be executed) of a task program for the robotic arm. In one embodiment, an imminent or visualized adjustment may comprise, in particular be, a direction, an actuating path and/or an adjustment velocity of the corresponding axis. In one embodiment, the imminent adjustment, in one development based on a task program, in particular a next program command (to be executed) or multiple next program commands (to be executed) of the task program, is predicted, in particular estimated, for the robotic arm and/or by a controller of the robotic arm, in one embodiment online or during operation of the robotic arm.

In one embodiment, in a technically common manner, a robotic arm base is the ambient-side or -proximal robotic arm link or, in regard to a robotic arm flange or robotic arm-guided tool (in a kinematic or structural manner), it is the most distal robotic arm link. In one embodiment, it may be stationary, which represents a particularly advantageous use of the present invention, since such stationary robotic arms regularly collaborate in a smaller space, longer and/or more frequently with humans. In another embodiment, the robotic arm base is mobile, in particular arranged on a mobile platform, which also represents an advantageous use of the present invention, since such mobile robotic arms regularly collaborate with multiple different humans.

An axis closest to the robotic arm base correspondingly refers to that (joint or movement) axis, in which the robotic arm base is connected (in an articulated manner) to another link of the robotic arm. In one embodiment, the axis closest to the robotic arm base is a, in particular vertical or horizontal, rotary axis.

The visual indication, or visualization, of the imminent adjustment (at least) of such an axis, in particular one closest to the robot arm base, represents a particularly advantageous use of the present invention since the pivot movements (about) such an axis are often space-consuming and/or are perceived to be particularly sudden and/or quick. In this way, a human can remain without risk or undisturbed next to a conventional articulating arm robot on a regular basis as long as said robot does not pivot about its axis closest to the robotic arm base or the human detects a corresponding imminent pivot movement in a timely manner.

A workspace in this case refers in particular to the Cartesian space, which the robotic arm can occupy structurally or kinematically or may occupy in closed-loop manner.

A work surface within the meaning of the present invention may comprise, in particular be, in particular a floor space of such a workspace and/or a workspace for the robotic arm and/or a human collaborating with the robotic arm. In one embodiment, the work surface, in one embodiment those closest to the robotic arm in each case, may comprise a surface(s) under the robotic arm, which the robotic arm can sweep over, in particular reach, from above, for example in other words a surface of a robotic cell floor, worktable, shelf, conveyor belt or similar and/or one or more objects, in particular workpieces, tools or similar, arranged hereon or hereunder.

In one embodiment, the first visualization means is arranged, in particular in a permanent or not non-destructively detachable or (non-destructively) detachable and/or in form-fitting specified pose, on a or the robotic arm base or robotic arm link, in particular a robotic arm link, closest to the robotic arm base, connected to the robotic arm base in a joint.

In one embodiment, by an arrangement on the robotic arm base, the visualization means can be advantageously arranged, in particular supplied with energy and/or controlled. In addition, it must not be moved with the robotic arm when adjusting the robotic arm. In one embodiment, the visualization means can be protected in this way. Additionally or alternatively, no energy is required for moving the visualization means.

In one embodiment, by an arrangement on the, in particular base-proximal, robotic arm link, the visualization means can be moved along with the arm link and thus be configured more compactly. In one embodiment, the visualization means is configured to be symmetrical to the (a) movement axis of the robotic arm link, in other words in one embodiment thus symmetrically configured to the first or robotic arm base-proximal axis, in order to advantageously visualize counter-clockwise movements about or in (into) this axis.

In one embodiment, by means of a (non-destructively) detachable arrangement, the visualization means can be used and/or retrofitted alternately or optionally on various robotic arms. In one embodiment, by means of a positively specified pose, a correct visualization can be assured or its precision can be improved. In one embodiment, the first visualization means and the robotic arm base or the robotic arm link comprise connection geometries that are complementary to each other for this purpose. In one embodiment, the precision of the visualization can be improved by means of a permanent arrangement.

In one embodiment, the first visualization means visually indicates at least one imminent position, in a specified time, of the at least one axis or a position of the at least one axis, which is expected to reach or occupy said position in a or the specified time, in one embodiment multiple imminent positions, in specified times, of the at least one axis or positions of the at least one axis, which it is expected to reach or occupy in the specified times.

The imminent adjustment can hereby be advantageously visualized since the user can prepare for the specified time(s). In one embodiment, the specified time is (in each case) adjustable and/or amounts to at least 0.1 seconds [s], in particular at least 0.5 s, in one embodiment at least 1 s, and/or 10 s at most, in particular 5 s at most, in one embodiment 3 s at most. Such time periods represent a particularly advantageous compromise of (still) timely and (already) relevant information.

In one embodiment, the specified time(s), in particular when operating or online, is or are determined variably, in particular as a function of an imminent, in particular next, stop position and/or velocity of the at least one axis, in one embodiment in such a manner that the axis, in the imminent position(s) or at the specified time(s), is expected to comprise (in each case) a specified distance from the current and/or imminent, in particular next, stop position. In particular, many of the specified times may be determined in such a manner that they divide up the actuating path of the axis up to the imminent, in particular next, stop position in a specified, in particular equidistant, manner.

In one embodiment, the first visualization means also visually indicates the (respective) current position of the at least one axis, and in one development also one or more, in one embodiment all, (interim) positions between the current position and the imminent position in a specified time. If the current position changes, in one embodiment the visualization also changes so that the visualization means in one embodiment visualizes a region moving (along) with the respective axis.

The imminent adjustment can hereby be advantageously visualized, in particular animated.

Additionally or alternatively, in one embodiment the first visualization means visually indicates a or the imminent, in particular next, stop position of the at least one axis or a stop position of the at least one axis, in which said axis is expected to come to a standstill soon, in particular next.

The imminent adjustment can hereby also be advantageously visualized since the user can prepare for the end of the imminent adjustment or the expected (next) stop position.

In one embodiment, for the purpose of visualizing the imminent position in a specified time or the imminent stop position of the at least one axis (in each case), the first visualization means illuminates a region, on this robotic arm, in particular of the robotic arm base, allocated, in particular corresponding, to this imminent position or stop position, in one embodiment one or more lighting means, allocated to this (stop) position or indicating these (stop) positions, of the visualization means, which are arranged on the robotic arm or the robotic arm base.

Additionally or alternatively, in one embodiment, the first visualization means for visualizing the imminent position or imminent stop position, in a specified time, of the at least one axis illuminates (in each case) a (corresponding), in particular circle-, circle segment-, or ellipse-like, surface under a halt space of the robot arm, (which it) (occupies or will occupy) in the imminent position or stop position of the at least one axis, in one embodiment by at least partially illuminating this surface, in particular by predicting an image on this surface.

The imminent adjustment can hereby be visualized in a particularly advantageous manner since the user must only keep an eye on the corresponding region on or under the robotic arm.

In one embodiment, the first visualization means illuminates the region or the surface if reaching the stop position is predicted in a first time period, and illuminates the region or the surface hereof differently if reaching the stop position is predicted in a second time period. In one embodiment, the visualization means can illuminate the region or the surface in a first color, brightness and/or size, in particular number of elements, if reaching the stop position in the first time period is predicted, and can illuminate in a different color, brightness and/or size, in particular number of elements, if reaching the stop position is predicted in the second time period.

The imminent adjustment can hereby be visualized in a particularly advantageous manner since, in addition to the actuating path, an actuating time or the time of reaching the stop position can be visualized for the user.

Additionally or alternatively, in one embodiment the first visualization means illuminates the region or the surface, if reaching the imminent position or stop position is predicted in a first extension of the robotic arm, and illuminates it differently if reaching the imminent position or stop position is predicted in a second extension of the robotic arm. In one embodiment, the visualization means can illuminate the region or the surface in a first color, brightness and/or size, in particular in a first number of elements, if reaching the imminent position or stop position is predicted in the first extension, and can illuminate in a different color, brightness and/or size hereof, in particular number of elements, if reaching the imminent position or stop position is predicted in the second extension.

The imminent adjustment can hereby be visualized in a particularly advantageous manner since, in addition to the actuating path, an extension of the robotic arm, in particular in other words a (more) extended pose or a less extended pose, can be visualized for the user.

In one embodiment, the first visualization means illuminates:
- a region on the robotic arm, which is allocated to a first imminent position in a specified first time of the least one axis, and/or a, in particular circle-, circle segment-, or ellipse-like, surface under a halt space of the robot arm in a first imminent position in a specified first time or a position of the at least one axis, which it is expected to reach or occupy in the specified first time, (on the one hand); and
- at least one region on the robot arm, which is allocated to another imminent position in a specified other time or an imminent stop position of the at least one axis, and/or a, in particular similar, in particular equally sized and/or equally contoured, surface under a halt space of the robot arm in at least one other imminent position in a specified other time or an imminent stop position of the at least one axis (on the other hand) at least partly sequentially and/or at least partly simultaneously and/or at least partly in a different color, brightness and/or size, in particular number of elements.

A progression of the imminent adjustment can hereby be advantageously visualized in each case alone, particularly in combination however.

In one embodiment, as a function of the imminent adjustment of the at least one axis of the robotic arm, the first visualization means displays various icons from a specified group of graphic icons, which comprise in one embodiment directional icons, in particular arrows or similar, warning icons, in particular prohibition icons or similar, and/or numbers and/or digits.

The imminent adjustment can hereby be advantageously visualized since a corresponding icon, such as a sense of direction of the adjustment, a warning and/or additional information can be visualized for the user.

In one embodiment, the first visualization means augments a brightness and/or color intensity of the illuminated region and/or the illuminated surface and/or the indicated icon in a specified fade-in period, which in one embodiment amounts to at least 0.1 s, in particular at least 0.25 s, and/or at most 1 s, in particular at most 0.5 s and/or depends on a state, in particular velocity, of the robotic arm and/or the imminent adjustment. Additionally or alternatively, the first visualization means reduces a brightness and/or color intensity of the illuminated region and/or the illuminated surface and/or the indicated icon in a specified fade-out period, which in one embodiment amounts to at least 0.1 s, in particular at least 0.25 s, and/or at most 1 s, in particular at most 0.5 s and/or depends on a state, in particular velocity, of the robotic arm and/or the imminent adjustment.

By means of such fading-in or -out, the imminent adjustment can be visualized in a particularly advantageous manner since changes can be better perceived on a regular basis.

In one embodiment, the first visualization means visualizes an imminent adjustment of the at least one axis of the robotic arm independently of an imminent adjustment of at least one other axis, in particular a distal (more distal) one or one that is distal (more distal) from the robotic arm base, in particular independently of an imminent adjustment of a distal robotic hand.

In one embodiment, a human can hereby concentrate advantageously on a critical (more critical) pivot motion of an axis closer or closest to the robot base, and in contrast can ignore a swiveling out of the robotic arm or a movement of a distal robotic hand, for example.

In one embodiment, a second visualization means visualizes an imminent adjustment of this other axis of the robotic arm, in particular in one of the ways described here for the first visualization means, in particular in other words on the robotic arm and/or in its workspace and/or on the work surface under the robotic arm.

In one embodiment, in addition to a critical (more critical) swivel movement of an axis closest to the robot base, a swiveling out of the robotic arm can also be visualized, for example.

In one embodiment, the first visualization means comprises one or more, in particular selectively controllable and/or dimmable, in particular extinguishable, lighting means, in particular LEDs, which may be arranged in one embodiment in one or more rows and/or in a ring-shaped manner. Additionally or alternatively, in one embodiment, the second visualization means comprises one or more, in particular controllable and/or dimmable, in particular extinguishable, lighting means, in particular LEDs, which in one embodiment may be arranged in one or more rows and/or in a ring-shaped manner. In one embodiment, the lighting means arranged in a ring-shaped manner are controlled, in particular lit or illuminated or dimmed in a (ring)segment manner.

In one embodiment, a or the region on the robotic arm or a or the surface under a halt space of the robotic arm can hereby be selectively illuminated in an advantageous manner.

According to one embodiment of the present invention, a system for operating a or the robotic arm comprises the first visualization means, wherein the system, in particular its first visualization and/or control means of the system, is set up in particular for controlling the first visualization means and/or robotic arm, for executing a method described here, in particular in a hardware- and/or software-, in particular program-related manner.

In one embodiment, the first visualization means becomes or is arranged, in particular in a detachable manner and/or in a pose specified in a form-fitting manner, to a robotic arm base or a robotic arm link, in particular a robotic arm link, closest to the robotic arm base, connected to the robotic arm base in a joint.

In one embodiment, the system, in particular its first visualization and/or control means, comprises:
means for the visualizing of at least one imminent position in a specified time and/or an imminent stop position of the at least one axis by the first visualization means, in particular for illuminating a region, allocated to an imminent position or stop position of the at least one axis, on the robotic arm and/or a, in particular circle-, circle segment- or ellipse-like, surface under a halt space of the robotic arm in the imminent position or stop position of the at least one axis, in particular for illuminating the region or the surface, if reaching the stop position is predicted in a first time period, and for different illumination, if reaching the stop position is predicted in a second time period; and/or for illuminating the region or the surface if reaching the imminent position or stop position is predicted in a first extension of the robotic arm, and for different illumination if reaching the imminent position or stop position is predicted in a second extension of the robotic arm; and/or means for illuminating a region on the robotic arm, which is allocated to a first imminent position in a specified first time, of the at least one axis, and/or to a, in particular circle-, circle segment- or ellipse-like, surface under a halt space of the robotic arm in a first imminent position, in a specified first time, of the at least one axis (on the one hand) and at least one region on the robotic arm, which is allocated to another imminent position, in a specified other time, or an imminent stop position of the at least one axis, and/or a, in particular similar, surface under a halt space of the robot arm in at least in another imminent position, in another specified time, or an imminent stop position of the at least one axis (on the other hand) at least partly simultaneously and/or sequentially and/or in a different color, brightness and/or size; and/or means for indicating various icons from a specified group of graphic icons by the first visualization means as a function of the imminent adjustment of the at least one axis of the robotic arm; and/or means for augmenting a brightness and/or color intensity of the illuminated surface and/or the indicated icon in a specified fade-in time and/or for reducing in a specified fade-out time; and/or means for visualizing an imminent adjustment of the at least one axis of the robotic arm by the first visualization means independently of an imminent adjustment of at least one additional axis of the robotic arm, in particular a second visualization means for visualizing an imminent adjustment of this other axis/these other axes of the robotic arm, in particular on the robotic arm and/or in its work space and/or on the work surface under the robotic arm.

According to one embodiment of the present invention, a robot comprises a or the robotic arm and a or the system for operating the robotic arm according to the method described here.

A means within the meaning of the present invention may be designed in a hardware- and/or software-related manner, in particular a data- or signal-linked, in particular digital processing unit, in particular a microprocessor unit (CPU), advantageously comprising a storage and/or bus system, and/or comprising one or more programs or program modules. The CPU can be designed to execute commands that are implemented in a program stored in a storage system, to record input signals from a data bus and/or provide output signals to a data bus. A storage system may comprise one or more, in particular different, storage media, in particular optical, magnetic, solid-body and/or other non-volatile media. The program may be created in such a manner that it is able to represent or execute the methods described here so that the CPU can execute the steps of such methods and thereby operate the robot (arm) in particular. In one embodiment, a computer program product may comprise, in particular be, a, in particular non-volatile, storage medium for storing a program or having a program stored on it, wherein executing this program causes a system or a controller, in particular a computer, to execute a method described here or one or more of its steps.

In one embodiment, one or more, in particular all, steps of the method are executed in a fully or partly automated manner, in particular by the system or its means.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
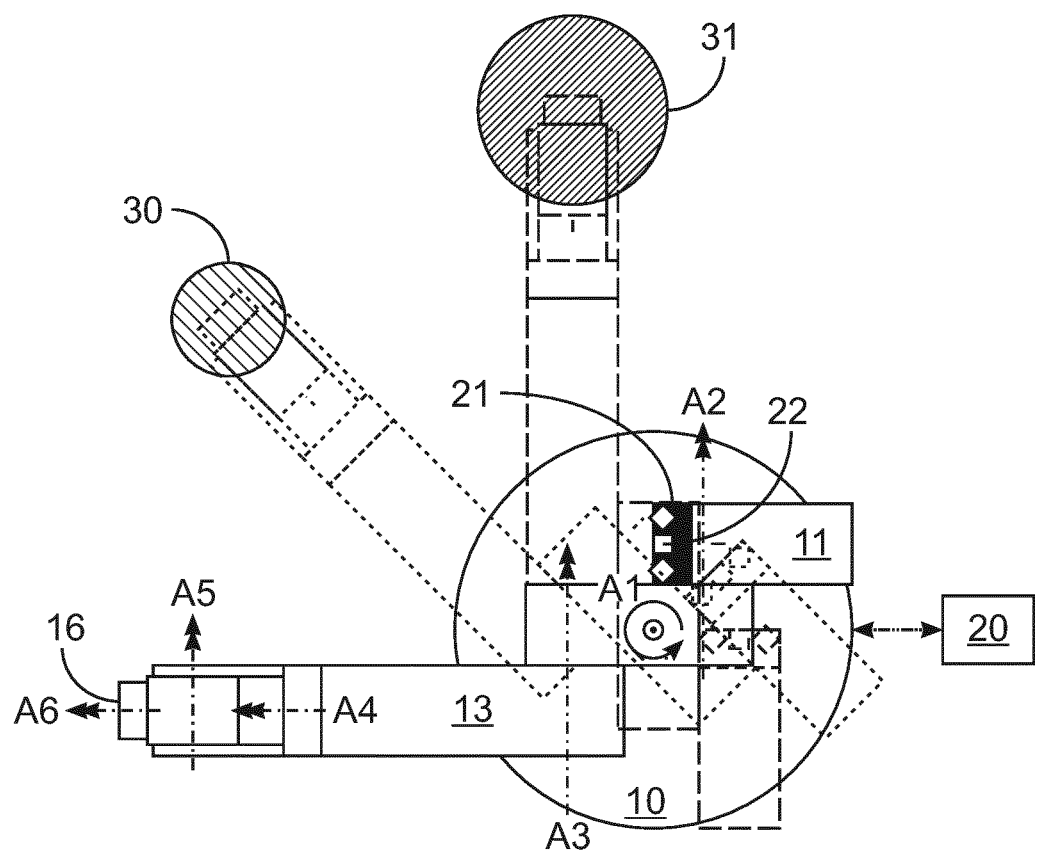
FIG. 1 schematically illustrates a robot having a robotic arm and a system for operating the robotic arm according to an embodiment of the present invention.

FIG. 1 depicts a robot having a robotic arm and a system for operating the robotic arm according to an embodiment of the present invention in a top view from above (vertical).

The robotic arm comprises a robotic arm base 10, which is connected in a rotary joint to a robotic arm link, closest to the robotic arm base, in the form of a carousel 11, which is thus adjustable about a vertical rotary axis A1, closest to the robotic arm base, relative to the robotic arm base 10.

Hinged to the carousel 11 about a horizontal rotary axis A2 is a link arm, to which is hinged a robotic hand 13 about a horizontal rotary axis A3, which comprises three pair-wise stacked, or perpendicular to rotary axis A3, distal rotary axes A4-A6.

The system comprises a robot controller 20 for adjusting the rotary axes A1-A6 and a first visualization means 21 having LEDs 22, which is arranged on the carousel 11.

The system executes a method for operating the robotic arm according to an embodiment of the present invention.

Figure 2:
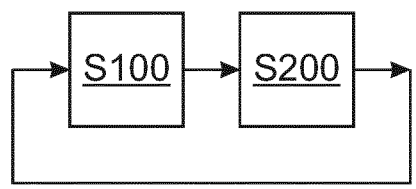
FIG. 2 illustrates a method for operating the robotic arm according to an embodiment of the present invention.

In a step S100 (cf. FIG. 2), the robot controller 20 predicts, for example on the basis of a task program to be executed or a next program command in this task program, an imminent adjustment of the rotary axis A1 closest to the robotic arm base.

The robot controller 20 thereby predicts on the one hand an imminent position in a specified time, for example a position that the robotic arm or its rotary axis A1 is expected to comprise or reach in one second (dotted in FIG. 1), and on the other hand an imminent stop position, in which the robotic arm or its rotary axis A1 is expected to be stopped (dashed in FIG. 1).

Then in a step S200, the system visually indicates, or visualizes, this imminent position by illuminating a circle-like surface 30 under a halt space of the robotic arm in the imminent position of the axis A1 or in a work surface of the robotic arm.

Additionally, the system visualizes in step S200 this imminent stop position, by illuminating in a darker or brighter manner and/or in a different color a larger, circle-like surface 31 under a halt space of the robotic arm in the imminent stop position of the axis A1.

To this end, one or more of the LEDs 22 of the first visualization means 21 correspondingly predict light on the surfaces 30, 31 and are to that end correspondingly controlled and/or dimmed selectively by the controller 20.

In modifications, additional surfaces under the halt space of the robotic arm can analogously be displayed in imminent positions of other specified times and/or the display of the imminent position in the specified time or the stop position can be omitted.

Figure 3:
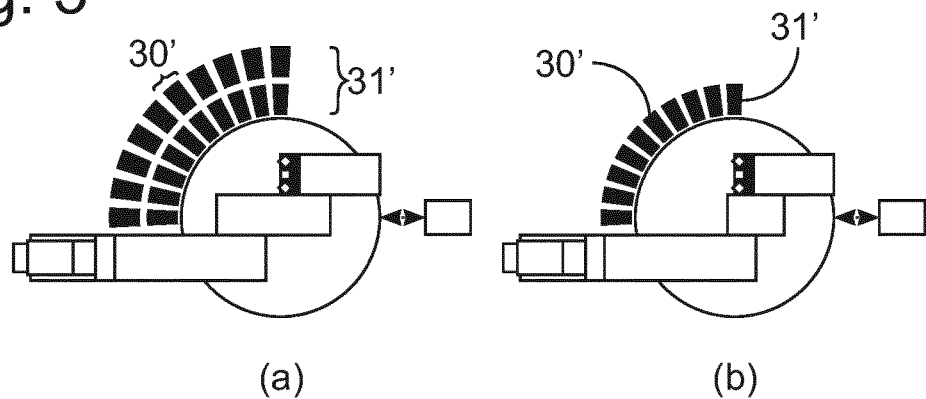
FIG. 3 schematically illustrates a robot having a robotic arm and a system for operating the robotic arm according to another embodiment of the present invention.

FIG. 3 depicts a robot having a robotic arm and a system for operating the robotic arm according to another embodiment of the present invention, which corresponds to the embodiment described above with reference to FIGS. 1, 2, except for the differences explained below.

In the embodiment of FIG. 3, the system visualizes the stop position by illuminating a circle segment-like surface 31' under the halt space of the robotic arm in the imminent stop position of the axis A1. Additionally, the system in the embodiment of FIG. 3 visualizes multiple positions, which the robotic arm or its rotary axis A1 is expected to comprise or reach at various times until reaching the stop position, by illuminating corresponding circle segment-like surfaces 30' under the respective halt space of the robotic arm in these positions of the axis A1.

The system thereby illuminates in each case two rows of the respective circle segment(s) 30', 31', if reaching the imminent position or stop position is predicted in a first, extended (more extended) or greater extension of the robotic arm (cf. FIG. 3 (a)), and in each case only one row of the respective circle segment(s) 30', 31', if reaching the imminent position or stop position is predicted in a first, less extended or smaller extension of the robotic arm (cf. FIG. 3(b)).

Figure 4:
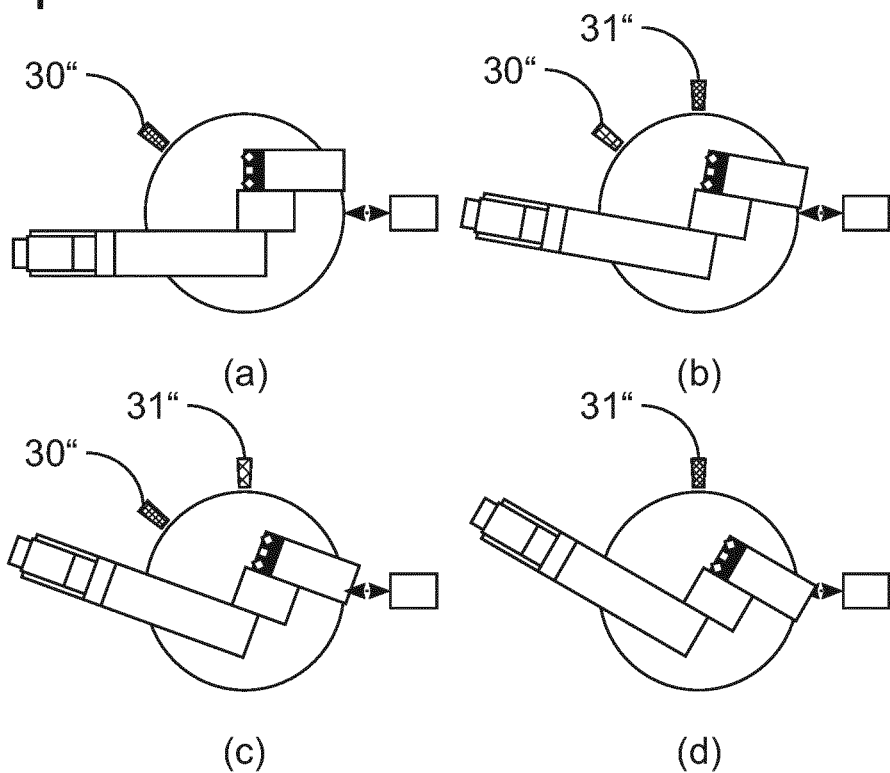
FIG. 4 schematically illustrates a robot having a robotic arm and a system for operating the robotic arm according to another embodiment of the present invention.

FIG. 4 depicts a robot having a robotic arm and a system for operating the robotic arm according to another embodiment of the present invention, which corresponds to the embodiments described above with reference to FIGS. 1-3, except for the differences explained below.

In the embodiment of FIG. 4, the first visualization means 21 illuminates a circle segment-like surface 30" under the halt space of the robotic arm in the imminent first position of axis A1 in the specified first time of 1 second and a similar surface 31" under a halt space of the robotic arm in the imminent stop position of the axis A1. The first visualization means thereby increasingly augments a brightness and/or color intensity of the illuminated surface 31" and simultaneously reduces a brightness and/or color intensity of the illuminated surface 30", as indicated by the time or figure sequence FIGS. 4(a)→(d) so that both surfaces 30", 31" are illuminated partly simultaneously and (by fading in surface 31" (cf. FIGS. 4(a)→(b)) and fading out the surface 30" (cf. FIGS. 4(c)→(d)) partly sequentially.

Figure 5:
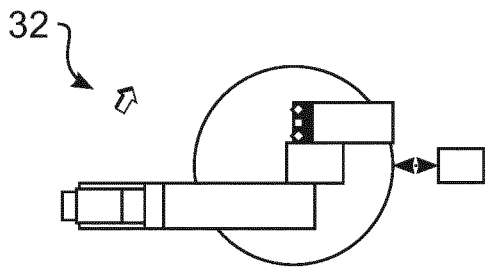
FIG. 5 schematically illustrates a robot having a robotic arm and a system for operating the robotic arm according to another embodiment of the present invention.

FIG. 5 depicts a robot having a robotic arm and a system for operating the robotic arm according to another embodiment of the present invention, which corresponds to the embodiments described above with reference to FIGS. 1-4, except for the differences explained below.

In the embodiment of FIG. 5, the system visualizes the imminent adjustment of the axis A1 by displaying an arrow icon 32 on the work surface under the robotic arm.

Figure 6:
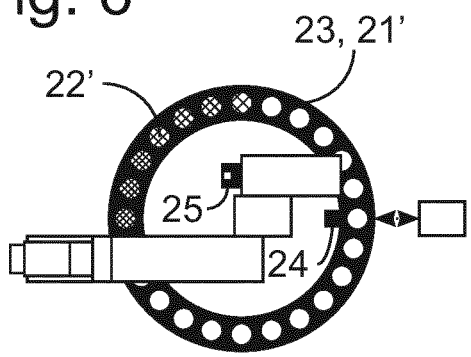
FIG. 6 schematically illustrates a robot having a robotic arm and a system for operating the robotic arm according to another embodiment of the present invention.

FIG. 6 depicts a robot having a robotic arm and a system for operating the robotic arm according to another embodiment of the present invention, which corresponds to the embodiments described above with reference to FIGS. 1-5, except for the differences explained below.

In the embodiment of FIG. 6, the first visualization means 21 comprises one or more rows of LEDs 22' arranged in a ring-shaped manner, which are arranged on a ring-like support 23, which is detachably attached to the robot base 10, wherein the pose of the support 23 relative to the robot base 10 is specified in a form-fitting manner by a corresponding connection geometry 24.

Additionally, a second visualization means 25 having LEDs is arranged on the carousel 11.

The system visualizes the imminent stop position as well as the various positions, which the robotic arm or its rotary axis A1 is expected to comprise or reach at various times until reaching the stop position, by the system illuminating corresponding LEDs 22'.

In addition, the system visualizes the imminent adjustment of the axes A2, A3 of the robotic arm by illuminating the corresponding LEDs of the second visualization means 25.

Even though the preceding description described illustrative embodiments, it is pointed out that a plurality of modifications are possible.

For example, particularly in the embodiment of FIG. 6, the first visualization means or the row(s) of LEDs 22' arranged in a ring-shaped manner may be attached in a stationary or permanent manner to the robot base 10.

In addition, it is pointed that that the illustrative embodiments involve only examples that are in no way meant to limit the protective scope, the applications and the construction. Instead, the previous description gives a person skilled in the art guidelines for implementing at least one illustrative embodiment, wherein various changes, in particular in regard to the function and arrangement of the described components, can be undertaken without departing from the protective scope as it emerges from the claims and these equivalent combination of features.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

10 Robotic arm base
11 Robotic arm carousel
13 Robotic hand
16 Robotic arm flange
20 Controller
21; 21' First visualization means
22, 22' LED
23 Ring support
24 Connection geometry
25 Second visualization means
30; 30'; 30" Surface under halt space of the robotic arm in the imminent stop position
32 Icon
A1 Axis closest to the robotic arm base
A2-A6 More distal axes

What is claimed is:
1. A method for operating a robotic arm, the method comprising:

visually indicating an imminent adjustment of a first axis closest to a base of the robotic arm with a first lighting element, comprising
simultaneously providing a visual indication of an imminent position in a specified time of the first axis and a visual indication of a next stop position of the first axis;
wherein the visual indication of the imminent position of the first axis and the visual indication of the next stop position of the first axis differ in at least one of color, brightness, or size; and
wherein the first lighting element comprises one or more rows of lights arranged in a ring-shaped manner around and attached to the base; and
wherein providing the visual indication of the imminent position of the first axis and the visual indication of the next stop position of the first axis comprises illuminating at least one of the lights; and
providing a visual indication of an imminent adjustment of a second axis of the robotic arm by illuminating a space on a work surface located under the robotic arm with a second lighting element arranged on a carousel of the robotic arm, the carousel being rotatable relative to the base about the first axis, a link arm being rotatable relative to the carousel about the second axis;
wherein the first lighting element indicates the imminent adjustment of the first axis of the robotic arm independently of the imminent adjustment of the second axis of the robotic arm.

2. The method of claim 1, wherein the first lighting element is at least one of:
permanently attached to the base; or
detachably attached to the base.

3. The method of claim 1, wherein illuminating the space comprises at least one of illuminating a circle, a circular segment, or an ellipse-like space.

4. The method of claim 1, wherein illuminating the space comprises at least one of:
illuminating the space in a first manner, if reaching a stop position of the second axis in a first time period is predicted, and illuminating the space in a second manner different from the first manner if reaching the stop position of the second axis in a second time period is predicted; or
illuminating the space in a third manner, if reaching an imminent position of the second axis or the stop position of the second axis is predicted in a first extension of the robotic arm, and illuminating the region in a fourth manner different from the third manner if reaching the imminent position of the second axis or the stop position of the second axis is predicted in a second extension of the robotic arm.

5. The method of claim 1, wherein providing a visual indication of an imminent adjustment of a second axis comprises:
illuminating a space on the work surface in an imminent first position of the second axis at a specified first time; and
illuminating a space on the work surface in an imminent second position of the second axis at a specified second time;
wherein the space on the work surface associated with the specified first time is illuminated at least partly simultaneously and/or sequentially and/or in a different color, brightness and/or size relative to the space on the work surface associated with the specified second time.

6. The method of claim 1, wherein providing a visual indication of an imminent adjustment of a second axis comprises displaying with the second lighting element one or more icons from a specified group of graphic icons as a function of the imminent adjustment of the second axis of the robotic arm.

7. The method of claim 1, wherein providing a visual indication of an imminent adjustment of a second axis comprises augmenting in a specified fade-in time, or reducing in a specified fade-out time, at least one of a brightness or a color intensity of the illuminated space on the work surface, or an icon displayed by the second lighting element and selected from a specified group of graphic icons as a function of the imminent adjustment of the second axis of the robotic arm.

8. The method of claim 1, wherein the first lighting element is at least one of:
selectively controllable; or
dimmable.

9. A system for operating a robotic arm, the system comprising:
a first lighting element configured for visually indicating an imminent adjustment of a first axis closest to a base of the robotic arm, the first lighting element configured to simultaneously provide a visual indication of an imminent position of the first axis in a specified time and a visual indication of a next stop position of the first axis; and
a second lighting element configured to provide a visual indication of an imminent adjustment of a second axis of the robotic arm, the second lighting element arranged on a carousel of the robotic arm, the carousel being rotatable relative to the base about the first axis, a link arm being rotatable relative to the carousel about the second axis;
wherein the visual indication of the imminent position of the first axis and the visual indication of the next stop position of the first axis differ in at least one of color, brightness, or size;
wherein the first lighting element comprises one or more rows of lights arranged in a ring-shaped manner around and attached to the base;
wherein the first lighting element is configured to provide the visual indication of the imminent position of the first axis and the visual indication of the next stop position of the first axis by illuminating at least one of the lights;
wherein the visual indication of the imminent adjustment of the second axis comprises illumination of a space on a work surface located under the robotic arm; and
wherein the first lighting element is configured to indicate the imminent adjustment of the first axis of the robotic arm independently of the imminent adjustment of the second axis of the robotic arm.

10. A robot having a robotic arm and a system for operating the robotic arm according to the method of claim 1.

* * * * *